(12) United States Patent
Beccarini et al.

(10) Patent No.: US 6,440,577 B1
(45) Date of Patent: Aug. 27, 2002

(54) PROPYLENE POLYMERS SUITABLE FOR TRANSPARENT CAST FILM

(75) Inventors: Enrico Beccarini, Ferrara; Giorgio Paci, Maddalena-Occhiobello; Franco Sartori, Ferrara, all of (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 09/463,819

(22) PCT Filed: May 27, 1999

(86) PCT No.: PCT/EP99/03661

§ 371 (c)(1),
(2), (4) Date: Jan. 31, 2000

(87) PCT Pub. No.: WO99/62966

PCT Pub. Date: Dec. 9, 1999

(30) Foreign Application Priority Data

Jun. 1, 1998 (IT) .......................................... MI98A1213

(51) Int. Cl.[7] .......................... B32B 27/00; B32B 27/08; C08F 8/00; C08F 110/06

(52) U.S. Cl. ...................... 428/500; 428/219; 428/220; 428/515; 525/333.8; 526/351

(58) Field of Search ................................ 428/220, 219, 428/515, 500; 525/333.8; 526/351

(56) References Cited

U.S. PATENT DOCUMENTS

| | | | | |
|---|---|---|---|---|
| 4,282,076 A | * | 8/1981 | Boynton | 204/159.2 |
| 4,567,089 A | * | 1/1986 | Hattori et al. | 428/213 |
| 5,231,144 A | * | 7/1993 | Yamamoto et al. | 525/333.8 |
| 5,401,439 A | * | 3/1995 | Elfers et al. | 252/358 |
| 5,691,049 A | * | 11/1997 | Morita et al. | 428/336 |
| 5,705,568 A | | 1/1998 | Gahleitner et al. | 525/194 |

FOREIGN PATENT DOCUMENTS

| | | |
|---|---|---|
| EP | 190 889 | 8/1986 |
| EP | 632 062 | 1/1995 |
| EP | 633133 | * 1/1995 |
| EP | 723 978 | 7/1996 |
| EP | 799 839 | 10/1997 |
| EP | 497 590 | 8/2000 |
| JP | 58007329 | * 1/1983 |
| JP | 08-176234 | 7/1996 |

* cited by examiner

Primary Examiner—Michael Barr
Assistant Examiner—Elena Tsoy

(57) ABSTRACT

Cast laminates produced from highly crystalline propylene polymers having a MFR ranging from 5 to 15 g/10 min, a ratio between the weight average molecular weight and the number average molecular weight ranging from 4.5 to 9, a density equal to or greater than 0.9020 g/cm$^3$, and solubility in xylene at ambient temperature not greater than 2.5% by weight.

14 Claims, No Drawings

PROPYLENE POLYMERS SUITABLE FOR TRANSPARENT CAST FILM

FIELD OF THE INVENTION

This invention concerns highly crystalline propylene polymers, and cast laminates produced from them. Moreover, it concerns a process for the production of said laminates from said polymers.

BACKGROUND OF THE INVENTION

The polymers of this invention make it possible for the laminates produced from them by way of the process of the present invention to have good optical qualities, particularly transparency and gloss, although maintaining, even at elevated temperatures, high mechanical properties, such as stiffness, that are typical of highly crystalline polypropylene. By virtue of the above mentioned characteristics and low percentage of solubility in xylene due to the high crystallinity of the polymers used, the laminates of this invention are particularly suitable for packaging food products.

Propylene polymers for the production of films with good transparency and high mechanical properties are already known. Said films are described, for example, in European patent EP 497590. According to said patent, the characteristics mentioned above are obtained by using highly crystalline polypropylene with a melt flow rate (MFR) ranging from 1 to 10 dg/min, and a ratio between weight average molecular weight ($\overline{M}_w$) and number average molecular weight ($\overline{M}_n$), i.e., $\overline{M}_w/\overline{M}_n$, ranging from 2.5 to 4.

Now it has surprisingly been found that it is possible to obtain cast laminates having both good transparency and good mechanical properties even by using propylene polymers with parameters outside those indicated in the above mentioned patent.

Thanks to the polymers of the present invention it is possible to produce laminates that at equal thickness possess good mechanical properties and even more transparency when compared to those obtained with polymers of the known art.

As mentioned above, said laminates also present an excellent gloss.

DETAILED DESCRIPTION OF THE INVENTION

Therefore, this invention provides propylene crystalline polymers having:

(a) MFR ranging from 5 to 15 g/10 min, preferably from 6 to 13, more preferably from 9 to 12;

(b) ratio between weight average molecular weight ($\overline{M}_w$) and number average molecular weight ($\overline{M}_n$), i.e., $\overline{M}_w/\overline{M}_n$, ranging from 4.5 to 9, preferably from 5 to 8, more preferably from 6 to 8;

(c) polydispersity index (PI), measured with the method described below, ranging from 2 to 6, preferably from 3 to 5;

(d) density equal or greater than 0.9020 g/cm$^3$; and (e) solubility in xylene at ambient temperature, i.e., at about 25° C., not greater than 2.5% by weight, preferably not greater than 2%;

said polymers can be obtained by way of chemical visbreaking of a polymer having a polydispersity index ranging from 5 to 8, preferably from 6 to 7.

The polymers of this invention are selected from propylene homopolymers, which are preferred, and copolymers of propylene with ethylene or a $C_4$–$C_8$ α-olefin, or their mixtures; mixtures of homopolypropylene and the above mentioned copolymers can also be used. The above mentioned α-olefins, that can be linear or branched, are preferably selected from 1-butene, 1-hexene, and 3-methyl-1-pentene. The quantity of ethylene in the copolymers does not exceed 1% in moles, while the quantity of $C_4$–$C_8$ α-olefin varies, for example, from 0.2 to 5% in moles, more preferably from 0.2 to 1%.

The polymers of the present invention are prepared in one or more polymerization stages using, among the known Ziegler-Natta catalysts, those that are highly stereospecific. In particular, the catalyst system used comprises (a) a solid catalytic component that comprises a titanium compound, and an electron-donor compound, both are supported on magnesium chloride, and (b) an Al-trialkyl compound and an electron-donor compound.

Examples of catalysts and polymerization processes that can be used are described in published European patent application EP-A-45977.

Therefore, this invention provides propylene crystalline polymers having:

(a) MFR ranging from 5 to 15 g/10 min, preferably 6 to 13, more preferably from 9 to 12;

(b) ratio between weight average molecular weight ($\overline{M}_w$) and number average molecular weight ($\overline{M}_n$), i.e., $\overline{M}_w/\overline{M}_n$, ranging from 4.5 to 9, preferably from 5 to 8, more preferably from 6 to 8;

(c) polydispersity index (PI), measured with the method described below, ranging from 2 to 6, preferably from 3 to 5;

(d) density equal or greater than 0.9020 g/cm$^3$; and (e) solubility in xylene at ambient temperature, i.e., at about 25° C., not greater than 2.5% by weight, preferably not greater than 2%;

said polymer being obtained by way of chemical visbreaking of a polymer having a polydispersity index ranging from 5 to 8, preferably from 6 to 7.

The usual additives, such as stabilizers and pigments, can be added to the polymers of this invention. In the production of laminates, the usual additives which are added are those specific to said sector, i.e., antiblocking (such as silica), and slip agents, such as erucamide. An additional object of this invention are the cast laminates prepared from the above mentioned polymers, having the optical and mechanical properties mentioned above. Said laminates, where the term is used to describe film and sheets, have a thickness ranging from 0.01 mm to 0.5 mm, typically from 0.01 to 0.4 mm.

The laminates of the present invention can be mono-layered or multi-layered. In the case of the latter, at least one layer consists of a polymer of this invention.

Generally speaking, the laminates of the present invention do not present fish eyes with dimensions greater than 1.5 mm, determined with the method described below. Typically, the number of fish eyes per square meter having dimensions ranging from 0.7 mm to 1.5 mm is not greater than 3, and there are no more than 300 fish eyes per square meter with dimensions ranging from 0.2 to less than 0.7 mm.

In order to obtain laminates having the above mentioned properties, the polymers undergo a lamination process which includes subjecting the laminate that has just been produced and is still hot, at the exit of the die for example, to immediate cooling to room temperature or even less, for example equal to or lower than 20° C., preferably lower than 15° C. Said cooling occurs in no more than 2 seconds, preferably 1.9 seconds.

A typical lamination process according to this invention comprises:

1) subjecting to extrusion and lamination the above mentioned propylene polymers; and consecutively 2) subjecting the laminate exiting the die of the extruder to a rapid cooling (quenching) until the surface of the laminate is cooled to a temperature not higher than 70° C. in a period of time not greater than 2 minutes.

The quenching of the laminate can occur in various ways: for example, by putting the laminate in contact with a surface, such as that of a rotating roller, maintained at a temperature lower than 20° C., preferably not higher than 15° C.

As an example of the process of this invention, the quenching of a 0.05 mm thick film starts 0.07–0.13 seconds after the film exits the die.

The extrusion of the polymers occurs by using conventional extrusion technologies and apparatus (for example a Bandera extruder), as well as operating conditions. Generally speaking, the laminate exiting the die of the extruder is conveyed to a roller whose surface temperature is maintained within the range mentioned above.

The following examples are given in order to illustrate, but not limit the present invention. Tests have been carried out on the polymer and film of this invention in order to evaluate their characteristics and properties; the methodology used to conduct said tests is described below.

Solubility: determined as the percentage of residue soluble in xylene at 25° C. in the following manner: one prepares a solution of the sample in xylene at a concentration of 1% by weight stirring the sample for one hour in xylene at 135° C. While still stirring, the solution is allowed to cool to 95° C., after which it is poured into a 25° C. bath where it is kept for 20 minutes without stirring, then the stirring is resumed for an additional 10 minutes. The solution is then filtered, and acetone is added to a portion of the filtrate in order to obtain the precipitation of the dissolved polymer. The polymer thus obtained is recovered, washed, dried, and finally weighed to determine the percentage soluble in xylene.

Melt Flow Rate (MFR): according to method ASTM-D 1238, condition L.

Polydispersity Index (PI): calculated by way of a dynamic test carried out with a RMS-800 rheometric mechanical spectrometer. The PI is defined by the equation $PI=10^5/Gc$, where the Gc (crossover modulus) value is the one where G' (storage modulus) coincides with G" (loss modulus). A sample is prepared with one gram of polymer, said sample having a thickness of 3 mm and a diameter of 25 mm; it is then placed in the above mentioned apparatus and the temperature is then gradually increased until it reaches a temperature of 200° C. after 90 minutes. At this temperature one carries out the test where G' and G" are measured in function of the frequency.

Flexural modulus of elasticity: ASTM D-790

Gel content: the number of fish eyes per square meter of a film 0.05 mm thick is determined by automatic count with an optic counter using the Sistemi Intelligenti sipar apparatus.

Haze: ASTM D-1003

Gloss: ASTM D-2457

Friction coefficient: ASTM D-1894, Condition D. The test is carried out on a laminate at 23° C. 24 hours after the extrusion. According to this method, in order to determine the friction coefficient (FC) the laminate is caused to slide on a metallic guide prepared according to method DIN 4768.

EXAMPLE 1

The following compounds (parts by weight) are extruded in a Bandera extruder (L/D=30):

(a) 99,642 parts of polypropylene having a solubility in xylene at ambient temperature equal to 1.7%, MFR of 3.5 g/10 min. and PI of 7.2;

(b) 0.34 parts of a composition comprising 50% by weight of silica and 50% by weight of erucamide, marketed by Grace under the trademark Syloblock 250H®;

(c) 0.018 parts of a composition comprising 10 parts of 2,5-dimethyl-2,5-di(tert-butylperoxy)hexane, and 90 parts of polypropylene flakes.

The operating conditions of the extruder are as follows:

temperature of zone 1: 190–250° C.;

melt temperature: 248° C.;

flow rate: 600 kg/h;

screw rpm: 150 rpm;

compression ratio: 3.5.

The melted polymer that exits the extruder's die (whose dimensions are 150×03 mm) at a temperature of 250° C., is conveyed onto a roller (chill-roll) 15.4 cm in diameter, placed at a distance of 15 mm from the die. The temperature of the roller is 10° C. and it moves at a speed of 7 m/min. The surface of the film is cooled to 68° C. by way of a 2 sec. contact with the above mentioned roller. The film thus produced has a thickness of 0.05 mm.

Comparative Example 1c

Example 1 is repeated with the difference that the polymer used has the characteristics shown in table 1. Before the chemical visbreaking the polymer has an MFR of 1.8 g/10 min.

Comparative Example 2c

Example 1 is repeated with the difference that the polymer used has the characteristics shown in table 1, but is not subjected to visbreaking.

Comparative Example 3c

Example 1 is repeated with the difference that during the filming process the cooling of the film surface to 68° C. occurs in more than 2 seconds.

EXAMPLE 2

Example 1 is repeated with the difference that the film has a thickness of 0.025 mm. Table 1 and 2 show the properties of the polymers used in the examples according to this invention and comparative examples, as well as the mechanical and optical properties of the extruded films.

TABLE 1

| Example and comparative examples | 1 | 1c | 2c |
|---|---|---|---|
| Properties of the polymer prior to chemical visbreaking | | | |
| MFRL g/10 min | 3.5 | 1.8 | 10.1 |
| PI | 7.2 | 3.9 | 4.3 |
| Properties of the polymer after chemical visbreaking | | | |
| MFRL g/10 min | 10.9 | 9.8 | 10.1 |
| PI | 4.01 | 3.0 | 4.3 |
| Density g/cm$^3$ | 0.9067 | 0.9005 | 0.9053 |
| Solubility in xylene weight % | 1.8 | 3.8 | 1.9 |
| Intrinsic viscosity dl/g | 1.51 | 1.62 | 1.55 |
| $M_w/M_n$ | 7.1 | 6.2 | 7.3 |

TABLE 2

| Example and comp examples | 1 | 1c | 2c | 3c | 2 |
|---|---|---|---|---|---|
| Thickness mm | 0.05 | 0.05 | 0.05 | 0.05 | 0.025 |
| Fish eyes D > 1.5 mm n/m$^2$ | 0 | 0 | 0 | 0 | 0 |
| Fish eyes D > 0.7–1.5 mm n/m$^2$ | 1 | 0 | 0 | 2 | 1 |
| Fish eyes D > 0.2 mm n/m$^2$ | 55 | 60 | 73 | 80 | 55 |
| Haze % | 2.4 | 2.2 | 10.3 | 6.8 | 1.5 |
| Gloss (45°) % | 82.7 | 83.9 | 68.0 | 60.7 | 98.7 |
| Gloss (60°) % | 139.4 | 133.1 | 109.0 | 105.0 | 149.0 |
| Tensile modulus tang MPa | MD 907 TD 807 | MD 658 TD 660 | MD 830 TD 750 | MD 751 TD 783 | MD 898 TD 866 |
| Tensile strength at yield MPa | MD 22.5 TD 22.1 | MD 17.9 TD 17.7 | MD 19.8 TD 19.4 | MD 21.2 TD 21.4 | MD 22.1 TD 21.9 |
| Elongation at yield % | MD 7.0 TD 6.7 | MD 9.7 TD 9.0 | MD 6.3 TD 7.1 | MD 8.4 TD 8.0 | MD 7.6 TD 7.6 |
| Tensile strength at break MPa | MD 40.9 TD 33.0 | MD 40.7 TD 33.9 | MD 40.7 TD 33.2 | MD 56.1 TD 30.2 | MD 48.2 TD 34.2 |
| Elongation at break % | MD 792 TD 769 | MD 793 TD 762 | MD 750 TD 770 | MD 590 TD 614 | MD 652.8 TD 609.7 |
| Elmendorf test N | MD 0.51 TD 1.24 | MD 0.50 TD 0.82 | MD 0.52 TD 1.02 | MD 0.19 TD 3.43 | MD 0.27 TD 3.23 |
| Static friction coefficient > 24 h | 0.37 | 0.42 | 0.40 | 0.15 | 0.40 |

MD = machine direction;
TD = transversal direction

What is claimed is:

1. Crystalline propylene polymers having:
   (a) MFR ranging from 5 to 15 g/l10 min;
   (b) ratio between weight average molecular weight ($M_w$) and number average molecular weight ($M_n$), i.e., $M_w/M_n$, ranging from 4.5 to 9;
   (c) polydispersity index (PI), which is defined by the equation PI=$10^5$/Gc, wherein the Gc (crossover modulus) value is the one where G' (storage modulus) coincides with G" (loss modulus) and ranges from 2 to 6;
   (d) density equal or greater than 0.9020 g/cm$^3$; and
   (e) solubility in xylene at ambient temperature, i.e., at about 25° C., not greater than 2.5% by weight;
   said polymers being obtained by way of chemical visbreaking of a polymer having a polydispersity index ranging from 5 to 8.

2. Polymers of claim 1 where the chemical visbreaking is carried out in the presence of free radicals initiators.

3. Polymers of claim 1 selected from homopolypropylenes.

4. A process for the production of the polymers of claim 1 comprising the polymerization, in the presence of Ziegler-Natta catalysts, of a polymer having a polydispersity index ranging from 5 to 8, and the chemical visbreaking of the polymer thus obtained.

5. A laminate comprising the polymers of claim 1.

6. A process for the production of cast laminates comprising:
   1) subjecting the propylene polymers of claim 1 to extrusion and lamination; and consecutively
   2) subjecting the laminate exiting the die of the extruder to a rapid cooling until the surface of the laminate reaches a temperature not greater than 70° C. in a period of time not greater than 2 seconds.

7. Laminates obtained from the process of claim 6.

8. Laminates of claim 7 having a thickness ranging from 0.01 mm to 0.5 mm.

9. Packaging for food, the packaging comprising the laminate of claim 8.

10. The crystalline propylene polymer of claim 1 wherein the polydispersity index (PI) ranges from 3 to 5.

11. The crystalline propylene polymer of claim 1 wherein the solubility in xylene at ambient temperature is not greater the 2% by weight.

12. Polymers of claim 2 selected from homopolypropylenes.

13. A process for the production of cast laminates comprising:
   1) subjecting the propylene polymers of claim 2 to extrusion and lamination; and consecutively
   2) subjecting the laminate exiting the die of the extruder to a rapid cooling until the surface of the laminate reaches a temperature not greater than 70° C. in a period of time not greater than 2 seconds.

14. A process for the production of cast laminates comprising:
   1) subjecting the propylene polymers of claim 3 to extrusion and lamination; and consecutively
   2) subjecting the laminate exiting the die of the extruder to a rapid cooling until the surface of the laminate reaches a temperature not greater than 70° C. in a period of time not greater than 2 seconds.

* * * * *